United States Patent Office 3,452,471
Patented July 1, 1969

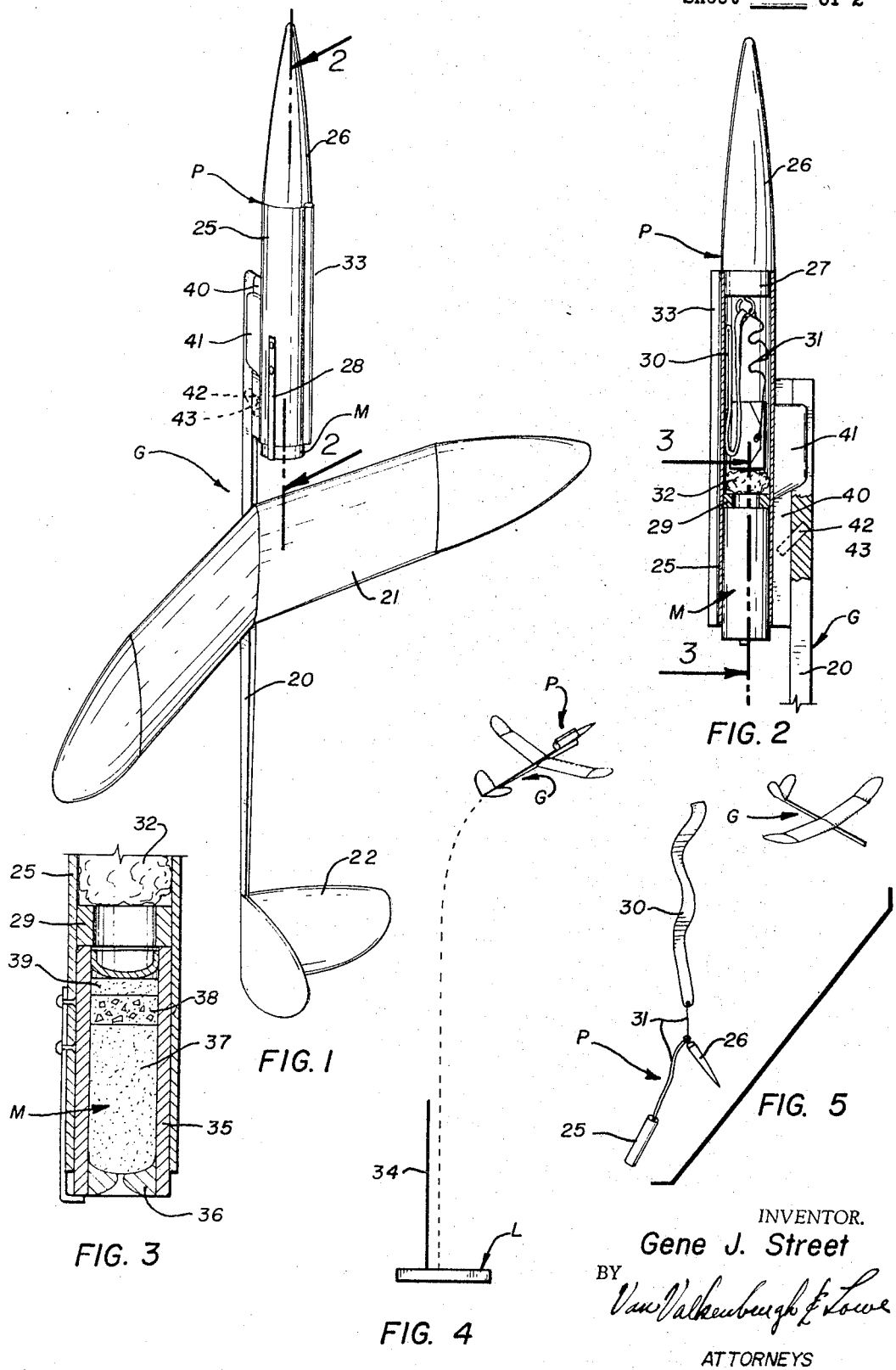

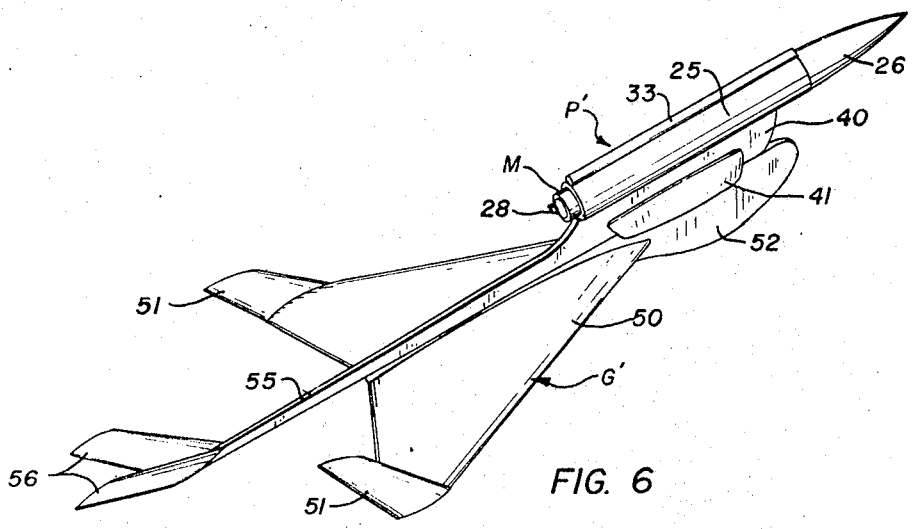
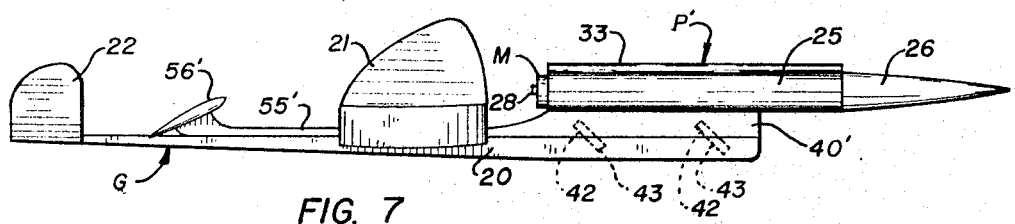
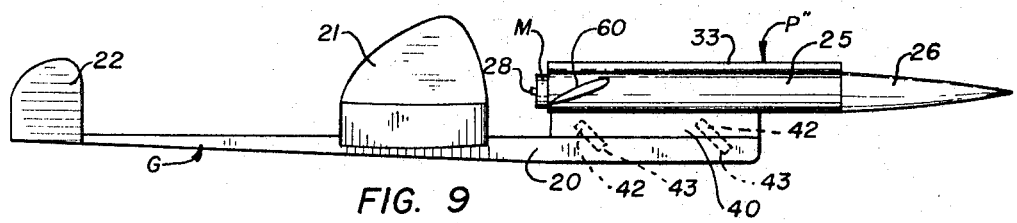
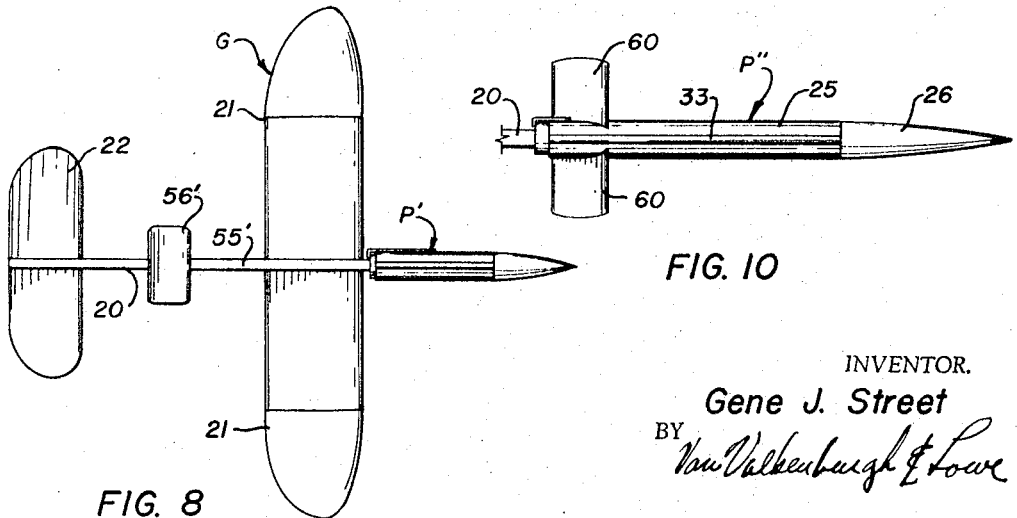

3,452,471
MODEL BOOST GLIDER
Gene J. Street, Penrose, Colo., assignor to Estes Industries, Inc., Penrose, Colo., a corporation of Colorado
Filed Aug. 11, 1967, Ser. No. 660,028
Int. Cl. A63h 27/14
U.S. Cl. 46—81                                          8 Claims

ABSTRACT OF THE DISCLOSURE

A model glider adapted to be lofted by a pyropulsive rocket motor which then disconnects from the glider to permit the glider to soar to the earth.

---

This invention relates to model aircraft, and more particularly to model gliders which are lofted by small jet engines to thereafter soar and glide earthward. Accordingly, the invention will be hereinafter referred to as a boost glider, a designation adopted by model rocketeers.

The invention relates more specifically to a model boost glider which combines the glider with an engine pod having a rocket motor therein. This unit is adapted for two phases of flight. The first phase is with the rocket motor in operation to loft the glider to a substantial elevation above the ground. The second phase, after the rocket motor burns out, commences with separation of the pod from the glider, the pod falling back to the earth and the glider assuming the selected flight pattern for which it is trimmed, such as for example a slow glide in a circular path.

The present invention is concerned with improvements in such arrangement with a primary object of the invention being to provide a novel and improved boost glider capable of sustained, efficient and dependable performance.

Another object of the invention is to provide a novel and improved construction of a boost glider which combines a model glider and a severable engine pod, in an aerodynamic, balanced manner permitting the glider to be preadjusted and pre-trimmed for a selected gliding flight once it is separated from the pod, and eliminating the need for complicated, adjustable ailerons, rudders and elevators in the glider to change its flight from one attitude, with the motor pod in position, to another attitude with the motor pod separated from the glider.

Another object of the invention is to provide a novel and improved construction of a boost glider having a motor pod structure which is securely connected to the body of the glider during a first phase of flight, when the glider is being lofted, but which easily separates from the glider at the commencement of a second phase of the flight, when the glider soars, and which is further adapted to have certain components of the pod structure separate to release a streamer or parachute to check its rate of fall and to also permit it to be easily observed and tracked while it is falling.

Another object of the invention is to provide, in a boost glider which combines a model glider and a severable engine pod, a novel and improved auxiliary airfoil means associated with the engine pod to produce in combination with pretrimmed airfoils of the glider, a properly trimmed combination for upward flight in a straight course while the motor in the engine pod is burning and before the glider and pod separate.

Other objects of the invention are to produce a novel and improved boost glider which is a simple, easily built, neat-appearing, low-cost unit and is capable of reliable, repeated performances.

With the foregoing and other objects in view, my invention comprises certain constructions, combinations and arrangements of parts and elements as hereinafter described, defined in the appended claims, and illustrated in preferred embodiment by the accompanying drawing in which:

FIGURE 1 is an isometric view of a preferred embodiment of a model boost glider constructed according to the principles of the invention, the view illustrating the unit as being vertical and essentially in the position it will be in when it is being lofted upwardly by operation of the motor within the engine pod.

FIGURE 2 is a longitudinal sectional view of the pod structure attached to the front end of the glider, as taken from the indicated line 2—2 at FIG. 1, but on an enlarged scale.

FIGURE 3 is a longitudinal sectional view of a fragment of the pod and the motor component within the pod, as taken from the indicated line 3—3 at FIG. 2, but on a further enlarged scale.

FIGURE 4 is a small-scale, diagrammatic view, suggestive of an upward lofting flight of the boost glider after it leaves a launching pad and to the apogee of its flight, but before the pod separates from the glider.

FIGURE 5 is a small-scale, diagrammatic view illustrative of the flight of the glider and the fall of the pod shortly after the pod has separated from the glider.

FIGURE 6 is a perspective view of a modified embodiment of the invention, wherein a single-wing type glider is combined with an engine pod having an auxiliary or compensating airfoil rearwardly of the glider.

FIGURE 7 is a longitudinal side view of a glider and engine pod similar to the showing at FIG. 1, but with the engine pod including an auxiliary or compensating airfoil adjacent to the tail of the glider.

FIGURE 8 is a plan view, on a reduced scale, of the unit shown at FIG. 7.

FIG. 9 is a longitudinal side view similar to FIG. 7, but depicting a further embodiment of the invention wherein an auxiliary or compensating airfoil is mounted upon the sides of the engine pod.

FIGURE 10 is a fragmentary plan view of the engine pod portion of the construction shown at FIG. 9.

Various types of model rockets and model gliders are adapted to use model rocket motors of the type which are formed as small cylindrical units which are easily mounted in the models. These motors have a pyropulsive charge capable of producing a sustained thrust for an appreciable time interval, sufficient to loft a model rocket or glider to an elevation of several hundred feet above the ground. When used with a model glider, a socket is provided to hold the motor, nevertheless, it is desirable to separate the motor from the glider after the motor has burned out and the model glider is at a maximum elevation above the ground. This permits the glider, relieved of the weight of the burnt-out engine, to soar to the earth in any desirable path depending upon the manner in which the glider is trimmed for its soaring flght.

In one construction proposed, the glider is provided with an engine pod which is adapted to contain the rocket motor and which is further adapted to be disconnected from the glider at the apogee of the flight when the motor burns out. Several problems developed in using a pod arrangement, the primary problem being that the model glider carrying the pod must be trimmed and balanced in one manner for a substantially straight, upward flight when the motor is functioning, which is quite different from the manner in which the model glider will be trimmed and balanced for a gliding, soaring flight without the pod. It was discovered that shiftable elevators and controls, which changed their position when the engine or motor separated from the glider, were not always satisfactory, and the better procedure was to trim and balance the glider with fixed elevators and controls. In doing so, it was discovered that the glider had to be also aerodynamically balanced when the pod carrying a motor was attached to it, so that it would fly upwardly along a straight path responsive to the thrust of the rocket motor within the pod. If not properly balanced, the flight path would be a vertical loop with the glider being driven into the ground a short distance from the launching point.

The present invention was conceived and developed with these considerations in view and comprises, in essence, an improved and simplified arrangement for releasably attaching an engine pod to a model glider, a pod structure which will eject a streamer or parachute as it commences its fall to slow down its fall and permit it to be easily spotted while falling. As a further refinement, a supplementary airfoil means may be carried by the engine pod to cooperate with the pre-trimmed glider airfoils to provide a properly trimmed combination of a glider and engine pod for the upward lofting flight by the motor within the engine pod.

Referring more particularly to the drawing, FIGURE 1 illustrates a lightweight glider G of a simple type having a stick body 20, a pair of wings 21 and a dihedral tail 22. The body 20 extends forwardly of the wings and provision is made for supporting an engine pod P at its front end.

The engine pod P is removable from the body extension, as will be hereinafter described, and in preparing the glider for flight without the pod, the wings and tail are adjusted and the body is suitably weighted, as with a small weight, not shown, to trim the unit for a desirable smooth gliding flight.

The motor pod P is formed as a lightweight, cylindrical shell 25, having its leading end closed by a lightweight nose cone 26, the base of the cone including a short stub 27 which slideably fits into the end of the shell 25. The shell 25 is adapted to receive a conventional, cylindrical model rocket motor M at its trailing end, and the motor M is held in position within the shell by a spring slip 28 attached to the side of the shell to grip the trailing edge of the motor M, and an abutment ring 29 within the shell 25 to contact the leading edge of the motor. The actual devices to hold the motor in the shell may be varied, for example, the spring clip may have a double end with the inner end extending through a suitable hole in the shell to hold the leading edge of the motor. Also, the motor may be frictionally held in place by a paper wrap about it.

The length of the pod is in excess of the length of the motor to provide a space between the nose cone stub and the rocket motor sufficient to accommodate a rolled-up parachute or streamer 30 to be positioned within the shell. A rubber band 31 is connected to the shell, the nose cone and the streamer to hold these members together when the motor fires an ejection charge as will be explained, and a wadding 32 adjacent to the motor, acts as a piston to push out the streamer and also prevents such an ejection charge from burning the streamer. To complete this pod P, a longitudinally disposed tube 33 is affixed to the body shell to facilitate launching of the unit. Launching may be in any suitable manner and preferably, by a launching pad L having an upstanding launching rod 34, as indicated at FIG. 4.

The rocket motor M, illustrated in section at FIG. 3, is conventionally cylindrical in form and standarized in size to be a replaceable item. The cylindrical body 35 is typically made as a thick walled, cardboard structure having a discharge nozzle 36 at its trailing end and a compacted driving charge of powder 37 within the body adjacent to the nozzle 36 which will burn to eject a high velocity jet through the nozzle. A delay charge 38, positioned forwardly of the driving powder charge 37 is adapted to ignite as the driving charge burns out, and when the delay charge burns through, a small explosive ejection charge 39 near the forward end of the motor is ignited. The ejection charge thus provides a small forwardly directed blast of gas from the motor. It follows that the action of this motor M within the shell is to first provide a rearwardly directed propulsive jet 37. Next, after this jet burns out, the delay charge 38 commences to burn for a short time interval, and thereafter, the ejection charge 39 is ignited to eject gas from the front end of the motor to separate the components.

The ejection charge 39 not only separates the nose cone 26 from the body shell 25, but also creates reverse action by the shell 25 which is used to disconnect the pod from the glider as will now be described. A longitudinally disposed base block 40 is affixed to one side of the engine pod cylinder 25 which block 40 sets upon the forward end of the stick-like body 20 to place the pod a short distance above the body. This block 40 is of the same width as the stick-shaped body 20 whereupon it is placed. A pair of opposed, flat pads 41 overhang this strip 40 to embrace opposite sides of the stick-body 20 with a moderately snug fit and thereby maintain the alignment of the engine pod P with the longitudinal axis of the glider. A pin 42 is affixed to the underside of the block 40 to extend at an outward, forward inclination from this surface and to fit into an opposing, correspondingly inclined socket 43 in the body stick 20 of the glider, as in the manner illustrated in the sectioned portion at FIG. 2, and in broken lines at FIG. 1. Whenever the motor M is ignited with the propulsive charge burning to loft the glider, the pressure of the inclined pin 42 in its socket 43 will hold the engine pod snugly in position upon the body stick 20. However, whenever the ejection charge 39 fires, the reverse action will separate the engine pod from the glider. To hold the pod on the glider at the beginning of a flight and to permit the ejection charge to separate the two components, the fit of the side pads 41 over the end of the glider body 20, and the fit of the pin 42 into the socket 43 is, as described, moderately loose, and simple adjustments can be made as by sanding the parts, or if too loose, using a small tissue paper spacer between the pads.

The arrangement illustrated at FIGURES 6 through 10 provide simple alternates in the manner in which the engine pod P may be built to provide aerodynamic balance to the glider when it is being lofted by the engine pod. When the lightweight glider is trimmed to provide a desirable soaring, gliding flight without the motor pod, the weight of the pod changes the aerodynamic characteristics completely and the axis of the thrust of the engine will normally be eccentric to the center of aerodynamic resistance of the glider and engine pod combination. The natural result of such eccentricity is to produce a moment which causes flight in a curved arc. For example, when a flight from a launching pad commences vertically and upwardly, the unit will loop to drive the model rocket into the ground. Some model gliders having the wings tilted on a substantial dihedral with respect to each other, such as the construction illustrated at FIG. 1, can naturally produce a unit, which when combined with the engine pod, will have the center of resistance located above the stick body 20, and the pod can be positioned to align the rocket motor thrust through this center. The only variation required to adjust such a combination to a balanced, reliable flight pattern resides in varying the height of the block 40 to place the pod closer to or further from the stick body 20, as needed.

In other types of gliders, this expedient is not at all practical, and in lieu thereof, a simple extension of the block 40 is provided to carry a compensating airfoil. FIGURE 6 illustrates a single-wing type glider G'. The triangular or delta-shaped wing structure 50 constitutes the body of the glider, and rudders 51 are provided at each outer corner of the body wings. A narrow, longitudinal leading nose plate 52 completes the unit. The engine pod P' is built substantially the same as that heretofore described, differing only in that the block 40' has a rearward extension 55 with a small airfoil surface 56 at its rearward end. In the construction illustrated, the block 40' is provided with the side pads 41 which embrace each side of the nose plate 52, and the connection of the pod to the glider G' is by an inclined pin on the block 40' which fits into a socket on the top surface of the nose plate in the manner heretofore described.

FIGURES 7 and 8 illustrate a glider G constructed essentially the same as the glider shown at Fig. 1, having a sticklike body 20, wings 21 and a tail structure 22. An engine pod P' is mounted upon the forwardly extended portion of the body 20 and is also the same as the pod P heretofore described, except for the block 40'. This block is modified, however, by having a rearward extension 55' which carries a rearward airfoil surface 56'. This airfoil surface 56', although illustrated as differing in form from the surface 56 shown at FIG. 6, and differing in location with respect to the rear of the respective gliders, will function in precisely the same manner as the airfoil surface 56.

Another modification of structure is illustrated at FIGURE 7 which relates to the manner in which the pod P is secured to the front end of the glider G. The side pads 41 are eliminated and a pair of outwardly, forwardly inclined pins 42 are provided at the undersurface of the block 40'. These two pins, in longitudinal alignment at the undersurface of the block 40', are adapted to fit into two sockets 43 at the top surface of the forward end of the stick 20. Accordingly, it is to be seen that the use of a pair of inclined pins, in alignment at the undersurface of the block 40', will provide an effective substitute for a single pin and the side pads 41 heretofore described although it may be somewhat more difficult to attain the desirable, moderately-loose, releasable fit of the pod on the glider, especially after repeated uses of the same.

The glider G illustrated at FIGURE 9, is the same type as that ilustrated at FIGURE 7, however, the engine pod P" is modified by providing a pair of compensating airfoils 60 on opposite sides of the body shell 25 of the pod to make a more compact driving structure. This arrangement elimintaes the rearward extension of the block 40, but in some instances, the airfoil 60 may not be as easy to adjust as the airfoil surface 56. Also, while the airfoil surfaces 60 are illustrated at FIGURES 9 and 10 as being permanently fixed to the body shell 25, it is to be noted that they can be easily modified to be adjustable in any suitable manner. Also, and especially with the airfoil 60, it is possible to adjust or set these airfoils in a manner which causes the glider and pod assembly to spin as it is being lofted upwardly.

I have now described my invention in considerable detail. However, it is obvious that others skilled in the art can build and devise alternate and equivalent constructions which are nevertheless within the spirit and scope of my invention.

I claim:
1. The combination of a model boost glider comprising a glider having its airfoil surfaces trimmed and adjusted for a selected gliding, soaring, flight, an engine pod releasably mounted upon the glider said sod having a pyropulsive model rocket motor, said rocket motor therein including a driving charge adapted to eject a jet from its trailing end to thrust the pod and glider forwardly and an oppositely-directed ejection charge adapted to impart a momentary reverse thrust to said pod after the driving charge burns out, and means interconnecting the engine pod and glider for releasing the pod from the glider responsive to the reverse thrust created by the burning of the ejection charge.

2. In the organization set forth in claim 1, wherein said connecting means includes an outwardly extending, forwardly sloping pin on the engine pod, and a mating, correspondingly sloping socket on the glider body adapted to receive the pin.

3. In the organization set forth in claim 2, wherein the engine pod includes a longitudinally extended block adapted to rest upon the body of the glider with the aforesaid pin extending from the contact surface of the block, and a side pad at each side of the block adapted to embrace a portion of the glider body to hold the engine pod in fixed alignment with respect to the axis of the glider.

4. In the organization set forth in claim 2, wherein the engine pod includes a second forwardly inclined pin, longitudinally aligned with the first said pin, and wherein the glider body includes a second socket adapted to receive the second said pin whereby the second pin cooperates with the first to hold the pod in fixed alignment with respect to the axis of the glider.

5. In the organization set forth in claim 1, wherein the engine pod includes a mounting block secured thereto which is adapted to fit upon the body of the glider, a rearward extension of said block extending from the engine pod, and a pair of airfoils mounted at the rearward end of the extension adapted to provide an aerodynamic compensating means for the glider carrying the engine pod.

6. In the organization set forth in claim 1, wherein said engine pod carries a pair of opposing, compensating airfoils adapted to provide an aerodynamic balance for the glider with the engine pod in position.

7. In the organization set forth in claim 1, wherein said engine pod comprises a cylindrical shell adapted to receive the motor at its rearward end, a mounting block longitudinally carried on the shell adapted to rest upon the body of the glider, an outwardly extending, forwardly sloping pin on the contacting surface of the mounting block and a mating, correspondingly sloping socket in the glider body adapted to receive the pin.

8. In the organization set forth in claim 7, wherein said motor is held in position within the shell by a clip contacting the rearward end of the motor and an abutment ring contacting the forward end thereof, a separable nose cone at the forward end of the shell, and a compartment within the body shell between the abutment ring and the nose cone adapted to retain a streamer or the like when the nose cone is secured in position.

References Cited

UNITED STATES PATENTS 3,031,797 5/1962 Gelfand _____ 46—81
3,068,612 12/1962 Simpson _____ 46—81
3,408,767 11/1968 Anderson _____ 46—81 XR

OTHER REFERENCES

American Modeler, vol. 52, No. 2, May 1959, p. 13.

F. BARRY SHAY, *Primary Examiner.*

H. DINITZ, *Assistant Examiner.*